United States Patent Office 3,332,935
Patented July 25, 1967

3,332,935
PREPARATION OF GUANOSINE AND
INTERMEDIATES THEREIN
Akihiro Yamazaki, Takashi Meguro, and Izumi Kumashiro, Kanagawa-ken, and Tadao Takenishi, Tokyo, Japan, assignors to Ajinomoto Co., Inc., Tokyo, Japan
No Drawing. Filed Aug. 5, 1964, Ser. No. 387,796
Claims priority, application Japan, Aug. 7, 1963, 38/40,606, 38/40,607; Oct. 29, 1963, 38/57,994
11 Claims. (Cl. 260—211.5)

The present invention relates to the preparation of intermediate compounds for synthesizing guanosine and of guanosine, and more particularly to a method of synthesizing guanosine from 5-amino-4-imidazolecarboxamide ribofuranoside.

Guanosine has an important use in the field of pharmacology. The sodium salt of guanosine 5'-phosphate has a pleasant taste and is a useful seasoning agent.

An object of this invention is to provide an improved industrial process for preparing a large amount of guanosine at low cost.

Prior methods for preparing guanosine were processes wherein yeast and/or plants were used as raw material, and merely involved isolating guanosine which was already present in the natural source in free or combined forms.

We have found that guanosine can be prepared from 5-amino-4-imidazolecarboxamide ribofuranoside, termed hereinafter AICAR, in a sequence of operations involving the reaction of AICAR with acetone in the presence of hydrogen chloride to give 5-amino-4-carbamoyl-1-(2',3'-O-isopropylidene-β-D-ribofuranosyl) imidazole, hereinafter termed Ip-AICAR.

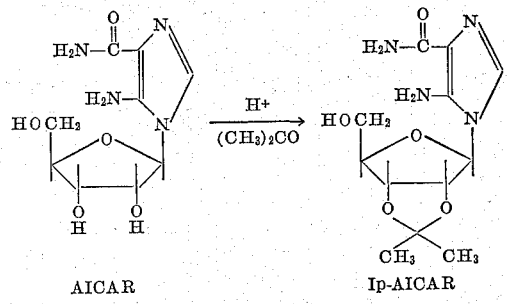

AICAR      Ip-AICAR

The new compound, Ip-AICAR, is the starting material for the method of our invention. Ip-AICAR is reacted with an aroylisothiocyanate to form 4-carbamoyl-5-(N'-aroylthiocarbamoyl) amino-1-(2',3'-O-isopropylidene-β-D-ribofuranosyl- imidazole as a first intermediate, hereinafter referred to as ArCO-NHCS-Ip-AICAR.

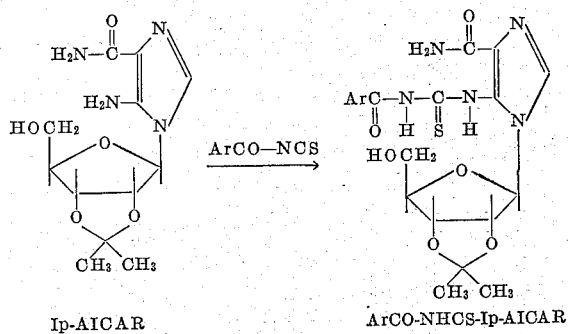

Ip-AICAR      ArCO-NHCS-Ip-AICAR (Ar: Aromatic radical)

ArCO-NHCS-Ip-AICAR is methylated to yield 4-carbamoyl-5-(N'-aroyl-S-methylisothiocarbamoyl) amino-1-(2',3'-O-isopropylidene-β-D-ribofuranosyl) imidazole as a second intermediate, hereinafter referred to as ArCO-N=C(SMe)-Ip-AICAR

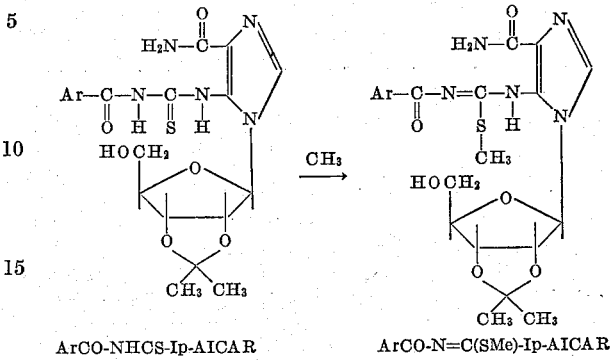

ArCO-NHCS-Ip-AICAR      ArCO-N=C(SMe)-Ip-AICAR

ArCO-N=C(SMe)-Ip-AICAR is converted to 2-N-aroyl-2',3'-O-isopropylideneguanosine as a third intermediate, hereinafter referred to as ArCO-Ip-GR, by heating.

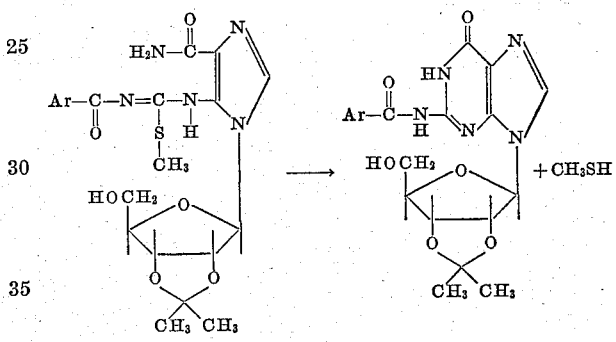

ArCO-N=C(SMe)-Ip-AICAR      ArCO-Ip-GR

ArCO-Ip-GR is hydrolyzed in an alkaline solution to form 2',3'-O-isopropylideneguanosine and further in an acidic solution to form guanosine, or the opposite sequence of hydrolyzing steps is performed.

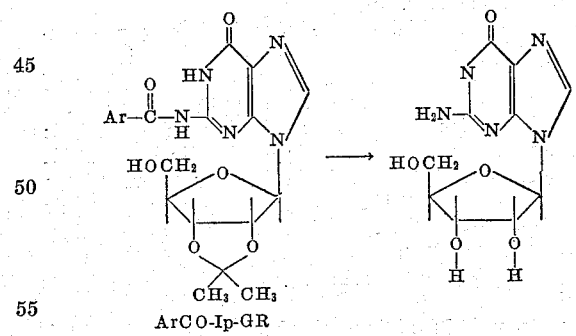

ArCO-Ip-GR

The present invention provides a synthesis of guanosine at very good yield and by a simple procedure from the relatively inexpensive and readily available AICAR.

We have found that Ip-AICAR and aroylisothiocyanate when heated in a suitable solvent, are converted to ArCO-NHCS-Ip-AICAR in very high yield.

Ip-AICAR may be obtained from AICAR by treatment with acetone in the presence of an acid or Lewis acid. Ip-AICAR may be obtained also from methyl 5-amino-1-(2',3'-O-isopropylidene-β-D-ribofuranosyl) imidazole-4-carboxylate (G. Shaw et al.; J. Chem. Soc., 1962, 2937) by amination. In the reaction of the present invention, the Ip-AICAR may be in the forms of pure crystals, crude crystals recovered from the reaction mixture used for preparing the Ip-AICAR, or the reaction mixture itself.

Preferred examples of aroylisothiocyanate for use in the present invention are benzoyl isothiocyanate and p-nitrobenzoyl isothiocyanate. The benzoyl isothiocyanate may be in the purified form or in the form of a mixture obtained by the reaction of a rhodanate, such as potassium rhodanate with an equimolar amount of an aroyl chloride in a suitable solvent, such as acetone while heating. The amount of aroyl isothiocyanate to be employed is about 1 to 1.5 moles per mole of Ip-AICAR, and more aroyl isothiocyanate may cause formation of undesired by-products.

The reaction of this invention proceeds in suitable organic solvents, such as acetone, N,N-dimethylformamide, pyridine, dimethyl sulfoxide or their aqueous solutions. The temperature may be between room temperature and about 150° C., preferably at 60 to 80° C. No pressure is necessary.

ArCO-NHCS-Ip-AICAR produced according to the present invention may be isolated from the reaction mixture by conventional methods. For example, the reaction solution is concentrated, filtered, if necessary, the volatile solvent is evaporated, and the crude crystalline product may be recrystallized from ethanol-benzene.

According to the present invention, ArCO-NHCS-Ip-AICAR may be formed in a yield of more than 90%.

The isolated ArCO-NHCS-Ip-AICAR may be identified by ultra-violet and infrared absorption spectra, and paper chromatography.

The preparation of the starting material, used in the process of this invention is described below for convenience of reference.

Part A.—Preparation of Ip-AICAR 138 ml. of dry ethanol was mixed with 115 ml. of dry acetone containing 9.1 g. of dried hydrogen chloride, and 13.0 g. of AICAR which had previously been dried at 80° C. for three hours in a vacuum was added to the mixture. The resultant solution was kept at room temperature for one hour. The reaction mixture was poured into 0.5 N-aqueous ammonia to adjust to pH 8.0.

The solution was concentrated in a vacuum, and Ip-AICAR was precipitated as crystals which weighed 11.4 g. (79%). The melting point was 166–170° C. (decomposed).

Only a single spot whose $Rf$ value was 0.82 was detected on a paper chromatogram in n-propanol:conc. ammonia:water=20:12:3 v./v.

The crude material was recrystallized from a water-ethanol mixture. The pure crystalline Ip-AICAR melted and decomposed at 170° C. An elementary analysis of the crystal satisfied the expected formula $C_{12}H_{18}O_5N_4$.

Calculated for $C_{12}H_{18}O_5N_4$: C, 48.31%; H, 6.08%; N, 18.78%. Found: C, 48.19%; H, 6.37%; N, 18.38%.

The following example is further illustrative of the synthesis of ArCO-NHCS-Ip-AICAR according to the invention, and it will be understood that the invention is not limited thereto.

EXAMPLE 1

One gram (3.35 millimoles) of Ip-AICAR and 140 ml. of acetone were heated to form a clear solution, and 0.66 gram (4.1 millimoles) of benzoyl isothiocyanate was added to the solution. After the mixture was refluxed for one hour, the resultant solution was evaporated to dryness in a vacuum, the crude crystals obtained were recrystallized from an ethanol-benzene mixture and 1.4 grams of a yellow crystalline powder were recovered, representing a yield of 90%.

An elementary analysis had the following results:
Calculated for $C_{20}H_{23}N_5O_6S$: C, 52.00%; H, 5.03%; N, 15.17%; S, 6.93%. Found: C, 51.90%; H, 5.11%; N, 15.38%; S, 6.75%.

Ultra-violet absorption spectra of the material in an aqueous solution showed max. 245 m$\mu$ and 270 m$\mu$ (shoulder) at pH 13 and $\lambda$max. 248 m$\mu$ and 275 m$\mu$ at pH 1. Its infra-red absorption spectrum showed a new absorption band near 1610 cm.$^{-1}$ which is supposed to be due to the benzamide group.

A single spot whose $Rf$ value was 0.88 was detected on a paper chromatogram prepared with a mixture of n-propanol-conc. amonia-water (20:12:3 v./v.).

The yellow powder was thus identified as 4-carbamoyl-5-(N'-aroylthiocarbamoyl) amino-1-(2',3'-O-isopropylidene-β-D-ribofuranosyl) imidazole, hereinafter referred to as Bz-NHCS-Ip-AICAR.

When the ArCO-NHCS-Ip-AICAR obtained is treated with a methylating agent, ArCO-N=C(SMe)-Ip-AICAR can be obtained in a very high yield.

Methylating agents which can be employed for the reaction of this invention include dimethyl sulfate and methyl halides, such as methyl iodide, methyl bromide or methyl chloride. The methylation reaction may be carried out in the presence of alkali, such as sodium hydroxide or sodium carbonate. The amount of methylating agent is about 1 per 3 moles to mole of ArCO-NHCS-Ip-AICAR, and an excess of the methylating agent is not necessary.

It is preferred to perform the reaction in a suitable solvent. Examples of suitable water-soluble and inert solvents are aliphatic lower ketones, N,N-dimethylformamide, their aqueous solutions, or water. The temperature may be from 0 to 100° C., and no pressure is necessary. The time required for the reaction is generally 30 minutes to a few hours, and varies with the solvent or the reaction temperature.

ArCO-N=C(SMe)-Ip-AICAR produced according to the reaction of this invention may be isolated from the reaction mixture in a conventional manner by precipitation, by solvent extraction or by the use of ion-exchange resins.

The yields of ArCO-N=C(SMe)-Ip-AICAR produced and isolated according to the present invention is almost quantitative.

The following examples are further illustrative of the second stage of the present invention.

EXAMPLE 2

1.55 grams (3.4 millimoles) of Bz-NHCS-Ip-AICAR was dissolved in 60 ml. of 0.2 normal aqueous sodium hydroxide solution, 0.43 gram of dimethyl sulfate was further added dropwise to the solution at room temperature while stirring, and the mixture was stirred for one hour.

The resultant solution was neutralized with a small amount of acetic acid to precipitate a gum. The gum was recrystallized from ethanol-benzene mixture, and 1.52 g. of pale yellow crystalline powder was obtained, representing a yield of 95%.

An elementary analysis had the following results:
Calculated for $C_{21}H_{25}N_5O_6S$: C, 53.04%; H, 5.32%; N, 14.72%; S, 6.74%. Found: C, 52.90%; H, 5.50%; N, 1.83%; S, 6.50%.

The ultra-violet absorption spectrum of the powder in aqueous solution showed $\lambda$max. 235 and 270 m$\mu$ at pH 13, and $\lambda$max. 250 m$\mu$ at pH 1.

The expected absorption bands were found in the infrared absorption spectrum.

Only a single spot whose $Rf$ value was 0.95 was detected on a paper chromatogram which was performed with a mixture of n-propanol-conc. ammonia-water (20:12:3 v./v.).

From these experimental results, the pale yellowish powder was identified as 4-carbamoyl-5-(N'-benzoyl-S-methylisothiocarbamoyl) amino-1-(2',3'-O-isopropylidene-β-D-ribofuranosyl) imidazole, hereinafter referred to as Bz-N=C(SMe)-Ip-AICAR.

EXAMPLE 3

The procedure of Example 2 was repeated except that 0.72 g. (5.1 millimole) of methyl iodide were used instead of dimethyl sulfate.

1.45 g. of the pale yellow powder was obtained in a yield of 91%.

We further have found that

ArCO-N=C(SMe)-Ip-AICAR when heated in a suitable solvent or without any solvent is converted to ArCO-Ip-GR while releasing methyl mercaptane, and that, when ArCO-Ip-GR is treated with alkali and then with acid or vice versa, guanosine is obtained in a very high yield.

ArCO-N=C(SMe)-Ip-AICAR, the starting material of this reaction may be in a pure form or crude as in a reaction mixture used for its preparation with or without an excess of the solvent.

Solvents which can be used in this reaction include aliphatic lower alcohols, such as methanol, ethanol, propanol or butanol, lower aliphatic ketones, such as acetone or methyl ethyl ketone, and N,N-dimethylformamide.

Better yields of ArCO-Ip-GR can be obtained by adding a catalyst to the reaction system. Suitable catalysts are ammonia and the hydroxides of the alkali metals and alkaline earth metals, such as sodium hydroxide, potassium hydroxide or calcium hydroxide. Ammonia has been found to be the most effective in amounts between 0.1 and 5 percent in the solvent.

The reaction of this invention is performed at about 150 to 170° C. for 1 to several hours without catalysts, and at 80 to 150° C. for a few hours in the presence of a catalyst. It is preferably carried out in a sealed tube or in an autoclave.

The yield of ArCO-Ip-GR is almost quantitative, for example, more than 95 percent as determined by paper chromatography.

ArCO-Ip-GR may be isolated from the reaction mixture by conventional methods, for example, by alumina column chromatography.

The ArCO-Ip-GR obtained above is hydrolyzed to guanosine almost quantitatively.

The following examples are further illustrative of the third stage of the present invention.

EXAMPLE 4

Part A.—Preparation of 2-N-benzoyl-2′,3′-O-isopropylideneguanosine 2.0 g. (4.2 millimoles) of Bz-N=C(SMe)-Ip-AICAR was dissolved in 20 ml. of ethanol containing 1% of ammonia, and the solution was maintained at 130° C. for one hour in a sealed tube.

The resultant solution was concentrated to a syrup. The syrup was dissolved in a small amount of ethanol-benzene mixture (50:50 v.v.), the solution was introduced into a column which was packed with 65 g. of alumina, more of the same solvent was added to the column and each 10 ml. fraction of eluate was separately collected. Eluates which had the strongest ultra-violet absorption were combined, and the volatile solvent was distilled off in vacuo to obtain crude crystals which were recrystallized from ethanol to a colorless crystalline powder, which weighed 1.1 g. (yield 61.2%).

An elementary analysis of the purified crystals agreed with the values for the expected formula $C_{20}H_{21}O_6N_5$:

Calculated for $C_{20}H_{21}O_6N_5$: C, 56.15%; H, 4.91%; N, 16.38%. Found: C, 55.87%; H, 5.16%; N, 16.63%.

Ultra-violet absorption spectra of the powder showed λmax. 265 mμ at pH 13, and λmax. 247 mμ and 280 mμ (shoulder) at pH 1.

The absorption bands of the infrared absorption spectrum satisfy the expected formula.

Only a single spot whose Rf value was 0.77 was detected on a paper chromatography which was carried out with solvent described in Example 1. A single spot whose Rf value was 0.70 was detected on a paper chromatogram which was performed with a mixture of n-butanol-acetic acid-water (4:1:1 v./v.).

From these experimental results, the colorless crystalline powder was identified as 2-N-benzoyl-2′,3′-O-isopropylideneguanosine.

Part B.—Preparation of 2-N-benzoylguanosine 2 g. of 2-N-benzoyl-2′,3′-O-isopropylideneguanosine was dissolved in 50 ml. of 50% aqueous solution, the pH of the solution was adjusted to 1.5 with 1 N-HCl solution, and the resultant solution was heated to 70° C. for 30 minutes. The reaction solution was neutralized with sodium hydrogencarbonate and extracted with chloroform (3 times 25 ml.) and the combined chloroform extracts were dried with anhydrous sodium sulfate. The chloroform was distilled off, and the residue was recrystallized from ethanol. The crystals obtained weighed 1.3 g. (72%).

An elementary analysis of the crystal had the following results:

Calculated for $C_{17}H_{17}O_6N_5$: C, 52.71%; H, 4.42%; N, 18.08%. Found: C, 52.92%; H, 4.88%; N, 17.70%.

Ultra-violet absorption spectra of the crystal showed λmax. 247 mμ at pH 1 and λmax. 265 mμ at pH 13. The infrared absorption spectrum showed an absorption band due to the benzoyl group.

Part C.—Preparation of guanosine 1 g. of 2-N-benzoylguanosine was added to 30 ml. of 0.5 N-sodium hydroxide solution and the mixture was refluxed for one hour. After cooling, the solution was neutralized with 18 ml. of a strongly acidic anion exchange resin of the hydrogen ion type (Amberlite IR–120), thereby partially precipitating the benzoic acid. After removal of the resin, benzoic acid was extracted from the clear solution with 3 times 20 ml. chloroform. The resultant aqueous solution was evaporated in a vacuum. The residue was recrystallized from water. The yield of guanosine was 0.5 g. (68.4%).

EXAMPLE 5

Part A.—Preparation of 2-N-benzoyl-2′,3′-O-isopropylideneguanosine 2.0 g. of Bz-N=C(SMe)-Ip-AICAR was dissolved in 20 ml. of ethanol, and the solution was kept at 160° C. for 3 hours. The yield of the reaction was 90 percent by paper chromatography. Crystalline 2-N-benzoyl-2′,3′-O-isopropylideneguanosine was obtained by a procedure similar to that described in Example 4. The crystals weighed 0.93 g. (52%).

Part B.—Preparation of 2′,3′-O-isopropylideneguanosine 2.5 g. of 2-N-benzoyl-2′,3′-O-isopropylideneguanosine was mixed with 60 ml. of ½ N sodium hydroxide solution, and the mixture was kept at 100° C. for 1 hour. The resultant solution was neutralized with acetic acid and the solution was concentrated in vacuo. The residue was refluxed with ether for 5 hours to remove benzoic acid and was then recrystallized from water. The colorless crystalline powder obtained weighed 1.2 g. (63.5%) and melted and decomposed at 295° C.

An elementary analysis had the following results:

Calculated for $C_{13}H_{17}O_5N_5$: C, 48.25%; H, 5.26%; N, 21.65%. Found: C, 48.65%; H, 5.68%; N, 21.88%.

Ultra-violet and an infrared absorption spectra were in full agreement with those published for 2′,3′-O-isopropylideneguanosine.

What we claim is:

1. 4 - carbamoyl-5-(N′-benzoylthiocarbamoyl)-amino-1 - (2′,3′-O-isopropylidene-β-D-ribofuranosyl)-imidazole of the formula

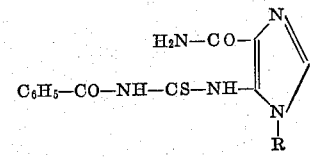

wherein R is the 2,3-O-isopropylidene-β-D-ribofuranosyl group.

2. 4 - carbamoyl - 5 - (N'-benzoyl-S-methylisothiocarbamoyl) - amino - 1 - (2',3'-O-isopropylidene-β-D-ribofuranosyl)-midazole of the formula

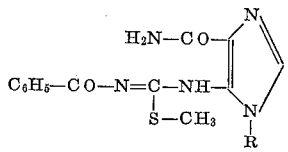

wherein R is the 2,3-O-isopropylidene-β-D-ribofuranosyl group.

3. A method of preparing 4-carbamoyl-5-(N'-aroylthiocarbamoyl) amino - 1 - (2',3'-O-isopropylidene-β-D-ribofuranosyl) imidazole, which comprises heating 5-amino - 4 - carbamoyl - 1 - (2',3'-O-isopropylidene-β-D-ribofuranosyl) imidazole with aroyl isothiocyanate.

4. A method as set forth in claim 3, wherein said heating is performed in a solution in a solvent selected from the group consisting of the organic solvents acetone, N,N-dimethylformamide, pyridine, dimethyl sulfoxide and aqueous solutions of said organic solvents.

5. A method of preparing 4-carbamoyl-5-(N'-aroyl-S-methylisothiocarbamoyl) amino - 1 - (2',3'-O-isopropylidene-β-D-ribofuranosyl)imidazole, which comprises reacting 4-carbamoyl-5-(N'-aroylthiocarbamoyl) amino-1-(2',3' - O - isopropylidene-β-D-ribofuranosyl) imidazole with a methylating agent.

6. A method as set forth in claim 5, wherein said methylating agent is a member selected from the group consisting of dimethyl sulfate and methyl halide.

7. A method as set forth in claim 5, wherein said reaction performed in solution in a solvent selected from the group consisting of aliphatic lower ketone, N,N-dimethylformamide, and water.

8. A method of preparing 2-N-aroyl-2',3'-O-isopropylidene-guanosine, which comprises heating 4-carbamoyl) - 5 - (N'-aroyl-S-methylisothiocarbamoyl) amino-1-(2',3'-O-isopropylidene-β-D-ribofuranosyl) imidazole to a temperature between 80 and 170° C.

9. A method as set forth in claim 8, wherein said heating is performed in the presence of a solvent selected from the group consisting of aliphatic lower alcohol, aliphatic lower ketone, and N,N-dimethylformamide.

10. A method as set forth in claim 8, wherein said heating is performed in the presence of a catalyst selected from the group consisting of ammonia, alkali metal hydroxide and alkaline earth metal hydroxide.

11. A method of preparing guanosine from 5-amino-4-carbamoyl - 1 - (2',3'-O-isopropylidene-β-D-ribofuranosyl) imidazole as a starting material which comprises: (a) heating said starting material with aroyl isothiocyanate, whereby 4-carbamoyl-5-(N'-aroylthiocarbamoyl) amino - 1 - (2',3'-O-isopropylidene-β-D-ribofuranosyl) imidazole is produced as a first intermediate; (b) reacting said intermediate with a methylating agent to form 4-carbamoyl - 5 - (N'-aroyl-S-methylisothiocarbamoyl) amino-1-(2',3' - O - isopropylidene-β-D-ribofuranosyl) imidazole; (c) heating said imidazole second intermediate to transform the same into 2-N-aroyl-2'-O-isopropylideneguanosine as a third intermediate; and (d) hydrolyzing said third intermediate.

References Cited
UNITED STATES PATENTS

| | | | |
|---|---|---|---|
| 3,082,203 | 3/1963 | Goldman et al. | 260—211.5 |
| 3,170,917 | 2/1965 | Laufer et al. | 260—211.5 |
| 3,201,388 | 8/1965 | Tsuchiya et al. | 260—211.5 |
| 3,208,997 | 9/1965 | Iwai et al. | 260—211.5 |

LEWIS GOTTS, *Primary Examiner.*

JOHNNIE R. BROWN, *Assistant Examiner.*